United States Patent [19]

Weiler

[11] 4,246,755
[45] Jan. 27, 1981

[54] MECHANICALLY CONTROLLED POWER BRAKE UNIT

[75] Inventor: Rolf Weiler, Frankfurt-Sindlingen, Fed. Rep. of Germany

[73] Assignee: ITT Industries, Inc., New York, N.Y.

[21] Appl. No.: 16,866

[22] Filed: Mar. 2, 1979

[30] Foreign Application Priority Data

Apr. 4, 1978 [DE] Fed. Rep. of Germany ....... 2814372

[51] Int. Cl.³ .................................. B60T 13/00
[52] U.S. Cl. .................................. 60/547 R; 60/583; 60/594
[58] Field of Search ............ 60/547 R, 583, 593, 60/594, 548, 552, 553, 554; 248/27.1; 92/169, 170; 91/369 R, 369 A, 369 B, 376 R

[56] References Cited

U.S. PATENT DOCUMENTS

| | | | |
|---|---|---|---|
| 3,072,106 | 1/1963 | Randol | 91/369 B |
| 3,127,966 | 4/1964 | Sheriff | 60/547 R |
| 3,222,868 | 12/1965 | Stelzer | 60/551 |
| 3,408,899 | 11/1968 | Golden | 92/169 |
| 3,689,013 | 9/1972 | Neugebauer | 248/27.1 |

Primary Examiner—Abraham Hershkovitz
Attorney, Agent, or Firm—John T. O'Halloran; Alfred C. Hill

[57] ABSTRACT

The power brake unit comprises a master cylinder, a booster utilizing the pressure difference between a vacuum and atmospheric pressure including a vacuum casing, and a cage-like housing structure embracing the vacuum casing and secured to a splashboard of a vehicle, with the master cylinder and the vacuum casing being secured to the housing structure in an operative relationship. The power brake unit is thereby supported by the housing structure in a manner to substantially reduce the lost travel of the brake pedal due to axial extension of the vacuum casing experienced in prior art arrangements caused by applied braking forces and enables a reduction of weight of the power brake unit since lighter weight materials may be employed in the various components of the power brake unit.

12 Claims, 2 Drawing Figures

MECHANICALLY CONTROLLED POWER BRAKE UNIT

BACKGROUND OF THE INVENTION

This invention relates to a power brake unit and more particularly to a power brake unit for an automotive vehicle comprising a master cylinder and a booster utilizing the pressure difference between a vacuum and atmospheric pressure.

From U.S. Pat. No. 3,222,868, a power brake unit is known comprising a vacuum casing including a cup shell and a cover shell, a working piston movable therein including a diaphragm and a push rod. A master cylinder of a hydraulic brake system is fastened to the front end of the cup shell of the vacuum casing. Bolts are provided in the cover shell which serve to secure the whole unit—power brake unit and master cylinder—to the vehicle.

In an arrangement of this type, the parts of the vacuum casing are conventionally made of sheet steel and the master cylinder is made of a gray cast iron casting or a light metal casting. To increase the mechanical load-carrying ability, the casing parts may be reinforced. When the brake pedal is depressed, the force transmitted from the brake pedal and the booster force are effective on the push rod. The sum of the forces acts on the piston of the master cylinder, the resistance of the compressed hydraulic fluid in the master cylinder requiring, however, the presence of a force component acting in the opposite direction to keep the master cylinder approximately in its position. This reaction force is transferred from the master cylinder via the parts of the vacuum casing to the splashboard to which the holding device for the pedal device is conventionally fastened. The reaction force causes an extension of the vacuum casing in an axial direction and, consequently displacement of the master cylinder, which results in an additional lost travel of the brake pedal.

Moreover, the known arrangements are unable to comply with the vehicle manufacturers' demand for a lowest possible weight of brake systems without the safety and operability of the power brake unit being impaired. Substituting light-metal parts for the sheet-steel parts is not reasonable because light metals have a lower modulus of elasticity which could be compensated for only by a greater geometrical moment of inertia. Neither is this design practical from the point of view of material costs.

SUMMARY OF THE INVENTION

It is, therefore, an object of the present invention to provide a power brake unit of the type referred to hereinabove, which permits a substantial reduction of the lost travel of the brake pedal and a marked reduction of the weight of the power brake unit.

A feature of the present invention is the provision of a mechanically controlled power brake unit for an automotive vehicle comprising: a master cylinder; a booster utilizing the pressure difference between a vacuum and atmospheric pressure including a vacuum casing; and a cage-like housing structure embracing the vacuum casing and secured to a splashboard of the vehicle, one end of the master cylinder and one end of the vacuum casing being secured to the housing structure to place the master cylinder and the booster in an operative relationship, the housing structure supporting the unit.

The essential advantages of the power brake unit of this invention are:
(a) the lost travel of the brake pedal is reduced substantially because the vacuum casing is not exposed to the actuating force;
(b) the negative effects, with respect to the lost travel, of the pneumatic forces acting on the vacuum casing are eliminated;
(c) the weight of the power brake unit is reduced by using other materials, eliminating reinforcements and employing thin-walled components; and
(d) it enables the casing parts to be made of less expensive and thinner materials.

In an advantageous improvement of the subject matter of this invention, the cage-like housing structure comprises a flange, preferably an annular flange, and several bracing ribs fastened to the flange. Such a design permits a simple and low-cost manufacture of the housing structure. The flange has suitably fastened to it both the vacuum casing and the master cylinder. The master cylinder is thus solidly connected with the vacuum casing and is supported by the splashboard through the housing structure. To ensure a high mechanical strength, bracing ribs made of profile bands, for example, of U-, L- or T-shaped profile, are particularly suitable. It will be an advantage to make the cage-like housing structure of light metal to thereby provide a further weight reduction. A still further weight reduction may be obtained by making the vacuum casing of light sheet metal or plastics.

In another advantageous embodiment of the subject matter of this invention, the cup shell of the vacuum casing and the cage-like housing structure are integrally formed. This is an advantage in cases where the cup shell and the housing structure are to be an integral light metal casting.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
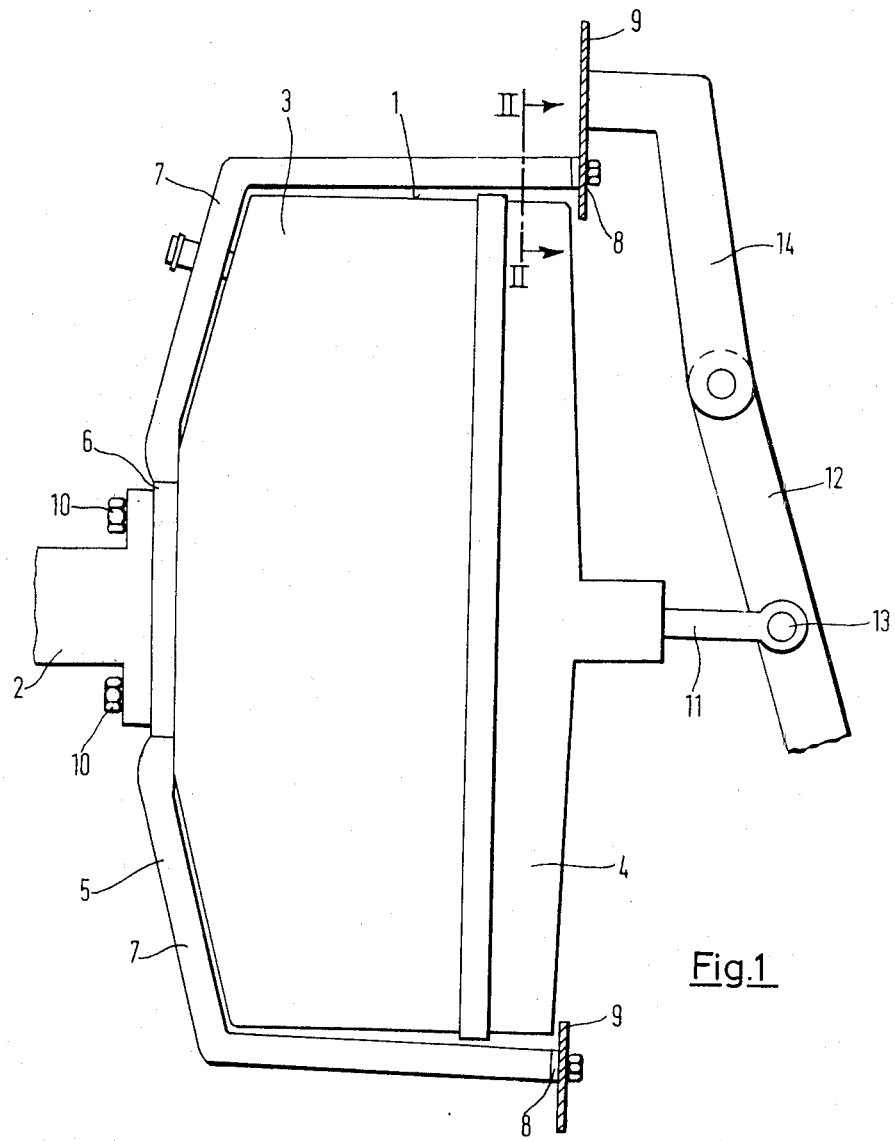
FIG. 1 is a power brake unit incorporating a cage-like housing structure in accordance with the principles of the present invention.

FIG. 1 shows a power brake unit comprising a vacuum casing 1 and a master cylinder 2. Vacuum casing 1 is composed of a cup shell 3 and a cover shell 4. A cage-like housing structure 5 comprises an annular flange 6 and several bracing ribs 7 fastened to annular flange 6 and departing from the latter approximately radially. Bracing ribs 7 are bent in such a manner that the shape of cage-like housing structure 5 corresponds approximately to the shape of cup shell 3. Bracing ribs 7 are welded to annular flange 6 and, for reasons of mechanical strength, are preferably made of profile bands. Disposed on each of the free ends of bracing ribs 7 is an end plate 8 serving to secure housing structure 5 to a splashboard 9. Cup shell 3 of casing 1 and master cylinder 2 are arranged on the inside and on the outside, respectively, of annular flange 6 of housing structure 5 and secured thereto by bolts 10. A push rod 11 which extends out of cover shell 4 is connected with a brack lever 12 through a swivel joint 13. One end of brake lever 12 is pivoted to a pedal holding device 14 which is fastened to splashboard 9.

Figure 2:
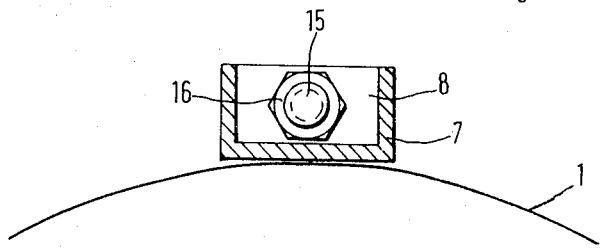
FIG. 2 is a section taken on the line II—II of FIG. 1.

FIG. 2 shows a section taken along the line II—II of FIG. 1. In this arrangement, reference numeral 1 designates the vacuum casing having on its outside a U-shaped bracing rib 7 with an end plate 8. End plate 8 is bolted to splashboard 9 shown in FIG. 1 by means of a bolt 15 and a nut 16.

The arrangement of this invention enables the achievement of another important advantage. By enlarging the cutout in the splashboard to the size of the vacuum casing material is saved and the weight of the splashboard is reduced. This invention is suitable for all mechanically controlled power brake units and particularly advantageous in power brake units having large dimensions.

While I have described above the principles of my invention in connection with specific apparatus it is to be clearly understood that this description is made only by way of example and not as a limitation to the scope of my invention as set forth in the objects thereof and in the accompanying claims.

I claim:

1. A mechanically controlled power brake unit for an automotive vehicle comprising:
   a master cylinder;
   a booster utilizing the pressure difference between a vacuum and atmospheric pressure including a vacuum casing; and
   a cage-like housing structure including a centrally disposed annular flange and a plurality of embracing ribs fastened to said flange, said housing structure completely enclosing said vacuum casing and secured to a splashboard of said vehicle, one end of said master cylinder and one end of said vacuum casing being secured to said housing structure to place said master cylinder and said booster in an operative relationship, said housing structure supporting said unit.

2. A unit according to claim 1, wherein said one end of said master cylinder and said one end of said vacuum casing are secured to said flange.

3. A unit according to claim 1, wherein each of said plurality of ribs are bands having a predeterminedly shaped cross-section.

4. A unit according to claim 3, wherein said cross-section is U-shaped.

5. A unit according to claim 3, wherein said cross-section is L-shaped.

6. A unit according to claim 3, wherein said cross-section is T-shaped.

7. A unit according to claim 1, wherein said housing structure is made of light metal.

8. A unit according to claim 7, wherein said vacuum casing is made of light sheet metal.

9. A unit according to claim 7, wherein said vacuum casing is made of plastic material.

10. A unit according to claim 1, wherein said vacuum casing is made of light sheet metal.

11. A unit according to claim 1, wherein said vacuum casing is made of plastic material.

12. A unit according to claim 1, wherein said vacuum casing includes
   a cup shell portion one end of which is said one end of said vacuum casing, and
said cup shell portion and said housing structure are integrally formed.

* * * * *